Nov. 28, 1944. K. R. WENDT 2,363,822
SAW-TOOTH DEFLECTION
Filed Jan. 2, 1941 2 Sheets-Sheet 1
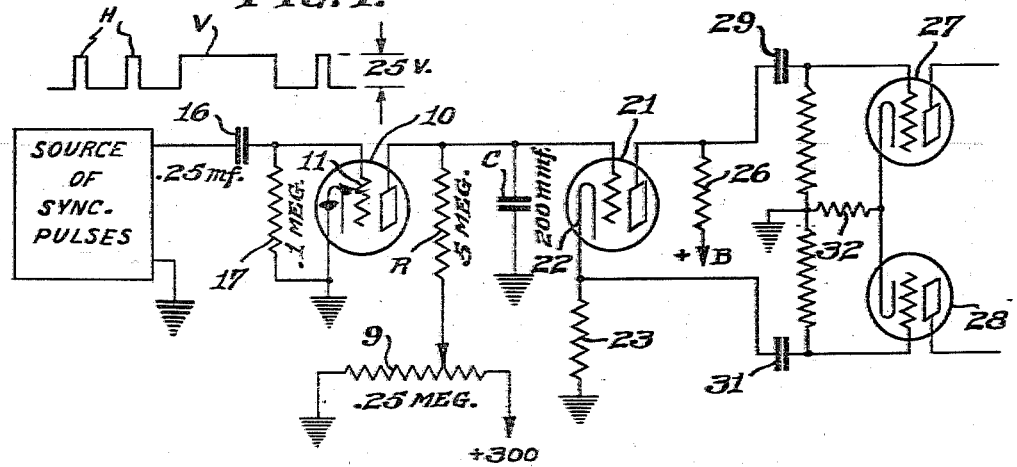
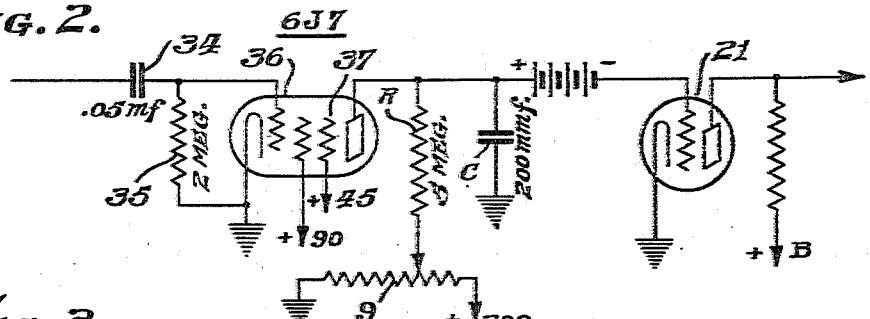
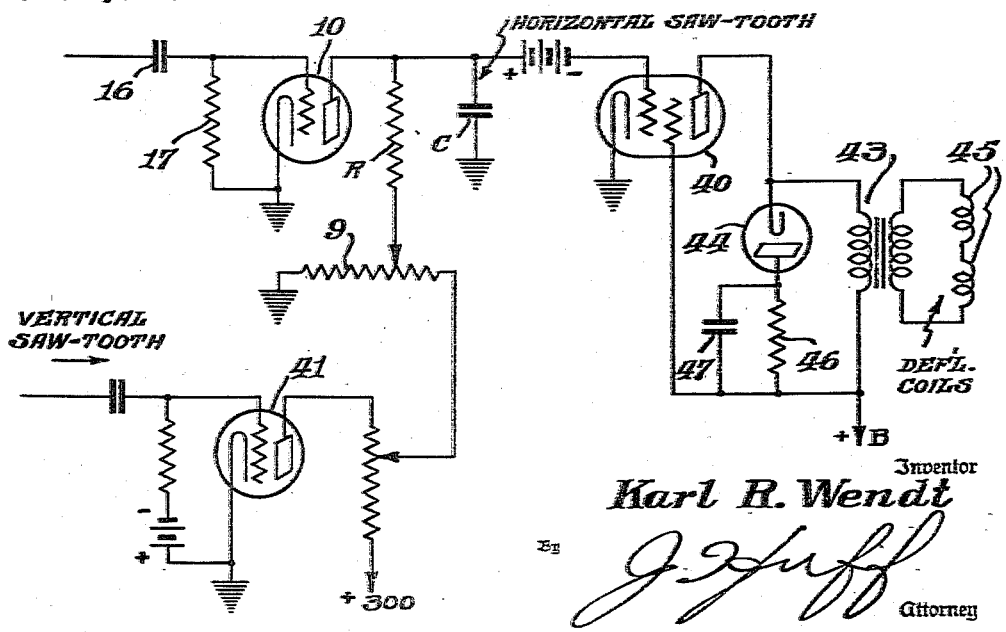
Inventor
Karl R. Wendt
Attorney

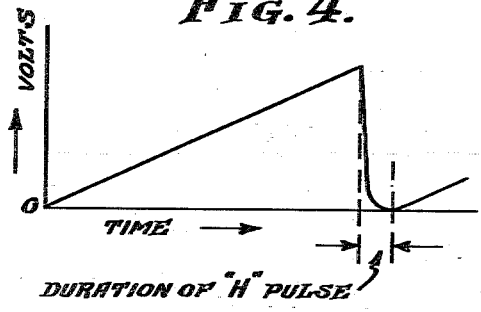
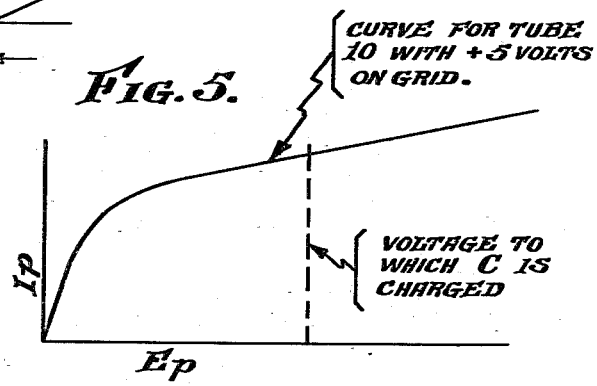
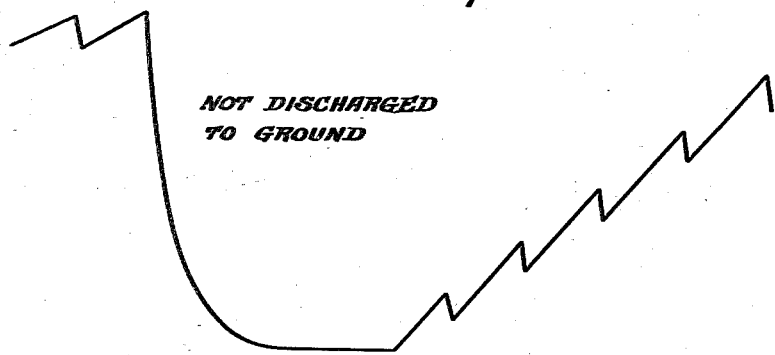
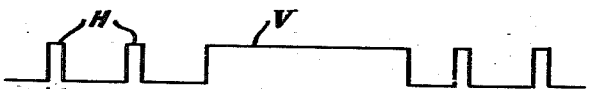

Patented Nov. 28, 1944

2,363,822

UNITED STATES PATENT OFFICE 2,363,822

SAW-TOOTH DEFLECTION

Karl R. Wendt, Audubon, N. J., assignor to Radio Corporation of America, a corporation of Delaware Application January 2, 1941, Serial No. 372,816

3 Claims. (Cl. 250—27)

My invention relates to cathode ray deflecting circuits and particularly to the production and synchronization of saw-tooth waves in television apparatus.

One of the objects of my invention is to provide an improved deflecting circuit which may be directly driven by the synchronizing pulses even though these pulses are a mixture of line synchronizing pulses and framing pulses.

Another object of the invention is to provide an improved deflecting circuit which may be driven by the blanking pulses that are provided to block periodically the electron beam of a cathode ray tube.

A further object of the invention is to provide an improved circuit for generating a saw-tooth voltage wave.

A still further object of the invention is to provide an improved circuit for obtaining keystone correction in television circuits or the like.

In practicing a preferred embodiment of the invention, a condenser of small capacity is charged slowly through a resistor of high resistance and discharged rapidly through a vacuum tube to ground potential to produce a saw-tooth voltage across the condenser. By making the capacity of the condenser small, it is possible always to discharge the condenser to a fixed potential, such as ground potential, at the end of each saw-tooth wave. The saw-tooth wave is impressed upon the input circuit of an amplifier tube by means of direct current coupling between the two tubes whereby there is avoided the presence of a grid leak resistor which would put a load across the condenser and spoil the shape of the saw-tooth voltage.

The above-described circuit is particularly useful in directly driven deflecting circuits and in circuits wherein keystone correction is obtained by modulating the line frequency or horizontal deflection saw-tooth waves by the vertical deflection waves.

The invention will be better understood from the following taken in connection with the accompanying drawings in which Figure 1 is a circuit diagram of one embodiment of the invention as applied to electrostatic deflection, Figure 2 illustrates a modification of a portion of the circuit of Fig. 1, Figure 3 illustrates the application of my invention to an electromagnetic deflection circuit having keystone correction, Figure 4 is a diagram illustrating the shape of the deflecting voltage generated by the circuit of Fig. 1, Figure 5 is a curve of a tube characteristic which is referred to in explaining the invention, Figures 6 and 7 are diagrams which are referred to in explaining the advantages of the circuit of Fig. 1, and Figures 8a and 8b are diagrams illustrating the operation of the circuit of Fig. 1.

Referring to Fig. 1, the invention is shown applied to a horizonal or line frequency deflection circuit comprising a condenser C across which a saw-tooth voltage is to be produced, a suitable voltage source (not shown) may be shunted by a potentiometer 9 from which a charging current is fed into the condenser C through a high impedance resistor R. The charging circuit just described causes a voltage to be built up across the condenser C as indicated by the straight line portion of the saw-tooth curve in Fig. 4 and as is well understood in the art. It will be understood that while the condenser C is being charged through the resistor R, the discharge tube 10, which preferably is of the high vacuum type and which is provided for the purpose of suddenly discharging the condenser C, is so negatively biased that it is non-conducting.

The condenser C is next caused to discharge rapidly to a fixed potential such as ground potential through the discharge tube 10 in response to a positive synchronizing pulse being applied to the control grid 11 of tube 10. An important feature of the invention is that the condenser C has such small capacity, and the circuit is otherwise so designed and driven by the incoming synchronizing pulses, that each synchronizing pulse will cause the condenser C to discharge to a fixed predetermined potential as stated above. This complete discharge of the condenser C to a fixed potential (ground potential in the present example) is illustrated in Fig. 4 by that portion of the curve located in the region labeled "Duration of H Pulse." As shown by this portion of the curve, upon the occurrence of a horizontal synchronizing voltage pulse H, the condenser C discharges very rapidly through the discharge tube 10 and it is substantially completely discharged while the pulse is still being applied to the grid of tube 10 whereby, at the end of the saw-tooth, the curve has a flat portion at ground potential or zero volts. Each succeeding line deflecting saw-tooth is the same as the one just described and illustrated in Fig. 4.

The deflecting circuit illustrated in Fig. 1 is a directly driven circuit, each saw-tooth wave being produced by the application of the horizontal synchronizing pulses themselves, indicated at H, to the grid 11 of the discharge tube 10. The particular circuit shown in Fig. 1 is designed for use in a television transmitter to provide the horizontal deflection of the cathode ray in the picture pickup tube. It has been the common practice to use directly driven deflecting circuits for the picture pickup tube, but in order to do this it has been considered necessary to provide from the synchronizing pulse generator two separate sources of synchronizing pulses, one being for horizontal deflection and the other being for vertical deflection. In addition, it was the usual practice to supply another group of pulses for blanking, that is, for blocking the beam of the pickup tube during the horizontal and vertical return line periods. The blanking pulses, horizontal and vertical, were mixed, while the horizontal and vertical synchronizing pulses were not.

My invention makes it possible to drive the horizontal deflecting circuit from a source of mixed synchronizing pulses such as the signal indicated in Fig. 1, where the horizontal synchronizing pulses are indicated at H and a vertical synchronizing pulse of comparatively long duration is indicated at V. In practice, this mixed signal may be the blanking signal itself. The main feature of interest in this signal, so far as the deflecting circuit operation is concerned, is that there is a discontinuity in the occurrence of the horizontal synchronizing pulses.

It has been stated that while the condenser C is being charged through the resistor R, the discharge tube 10 is non-conducting. The neecssary bias to hold the tube 10 non-conducting between synchronizing pulses is obtained by means of grid leak biasing, the synchronizing pulses being of positive polarity and of sufficient amplitude to drive the grid 11 positive to produce a flow of grid current which puts a direct current charge on the grid condenser 16. At the end of the pulse the condenser 16 discharges a certain amount through the grid leak resistor 17 whereby a sufficient voltage drop is produced across the grid resistor to hold the grid 11 at the desired negative potential between pulses.

The synchronizing pulses also are of sufficient amplitude, 25 volts, for example, to drive the grid 11 so far positive that the condenser C will discharge rapidly to ground potential. For example, the synchronizing pulses may be impressed on the grid 11 with sufficient amplitude to hold the grid 5 volts positive during the occurrence of the pulse. In that case, the plate current-plate voltage curve for the discharge tube 10 during the time the condenser C is discharging is represented by the curve in Fig. 5. It will be apparent from the steepness of this curve in the region of the lower plate voltages that, as the condenser C loses most of its charge, the plate impedance of the discharge tube 10 becomes very low whereby complete discharge of the condenser C is insured.

It has been found that satisfactory operation is obtained if the discharge tube 10 is a high-mu triode, such as a 6N7. Also, excellent results may be obtained by employing a pentode for discharging the condenser C providing the proper voltages are applied to its electrodes as will be described hereinafter in connection with Fig. 2.

In accordance with the preferred embodiment of my invention the saw-tooth voltage wave appearing across the condenser C is applied to an amplifier or output tube 21 through a direct current connection whereby the tube 21 requires no coupling or grid condenser and no grid leak resistor.

The cathode 22 of tube 21 is connected to ground through a cathode resistor 23 whereby the cathode 22 is held positive with respect to ground and with respect to the grid of tube 21. This makes unnecessary the use of the negative biasing battery commonly located in the D. C. connection of D. C. amplifiers.

The cathode resistor 23 is employed for a second purpose, namely, to permit operation of the tube 21 as a cathode follower tube so that signal of one polarity may be obtained from across the cathode resistor 23 and signal of the opposite polarity obtained from across the plate resistor 26 for the purpose of feeding into a push-pull amplifier.

The push-pull amplifier comprises amplifier tubes 27 and 28 which are coupled through the coupling condensers 29 and 31 to the output resistors 26 and 23, respectively. The grids of tubes 27 and 28 are negatively biased by means of a cathode resistor 32.

The output circuit of the push-pull amplifier may be a conventional balanced circuit for supplying the saw-tooth voltage wave to a pair of electrostatic deflecting plates.

In the present invention the elimination of the grid leak resistor, which in the case of an A. C. connection would be effectively in shunt to the condenser C, is very important because of the circuit constants required by the invention, specifically because of the low capacity of condenser C and the high resistance of resistor R.

It will be understood that condenser C must have small capacity to make possible its complete discharge during the occurrence of a horizontal synchronizing pulse H. It follows that the resistor R through which condenser C is charged must have a very high resistance if each saw-tooth wave is to have the proper amplitude and wave shape. In other words, if the resistor R had a comparatively low resistance, such as 100,000 ohms frequently employed in horizontal deflecting circuits, the condenser C would receive full charge long before the end of the desired saw-tooth. Since a shunting resistance across conenser C would have an effect similar to a reduction in the resistance of resistor R, the use of a grid leak resistor in the grid circuit of the tube 21 would make it impossible to obtain across the condenser C a voltage having a good saw-tooth wave shape and it would be necessary to resort to wave shape correction circuits or networks.

Another disadvantage of an A. C. connection between the tubes 10 and 21 as compared with a D. C. connection is that during the vertical synchronizing pulse time (when there are no horizontal synchronizing pulses) an A. C. coupling condenser could not hold enough of its charge to prevent saw-tooth voltage output from having the characteristic shown in Fig. 7. As illustrated in this figure, at the end of the vertical synchronizing time the horizontal saw-tooth waves start at a higher voltage level than they should and are brought back to the desired voltage level (where the condenser C is discharged to ground potential each time) only after a succession of horizontal synchronizing pulses.

In the circuit illustrated in Fig. 1, on the other hand, a signal such as shown in Figure 8a when applied to the discharge tube 10 will produce in the output circuit of the tube 21 saw-tooth voltage waves having the characteristics shown in Figure 8b. It will be apparent that immediately following the vertical synchronizing period the horizontal deflecting saw-tooth waves are at the desired voltage level and will deflect the cathode ray without any undesired disturbance or distortion of the deflection on the scanning screen.

It may be of interest to compare the results obtained with the present invention with those obtained by a conventional horizontal deflecting circuit for the case where the deflecting circuit is being driven by the mixed horizontal and vertical synchronizing pulses. The resulting sawtooth output for such operation of a conventional circuit is illustrated in Fig. 6. It will be seen that during the vertical synchronizing period the saw-tooth condenser loses much more of its charge than it does during a horizontal synchronizing period, and that at the end of the vertical synchronizing period the charge on the condenser gradually builds up as the horizontal saw-tooth waves are generated. This is not a useable signal and it is because of this that it previously has been the practice in television transmitters, where directly driven deflecting circuits are employed, to drive the horizontal and vertical deflecting circuits from separate horizontal and vertical synchronizing pulse outputs.

As previously mentioned and as illustrated in Fig. 2, the condenser C may be discharged through a pentode, such as a 6J7, indicated at 36. In Figs. 1 and 2 like parts are indicated for the same reference characters. The main point to be noted in connection with the use of the pentode 36 is that its suppressor grid 37 is operated at a positive potential, this potential being 45 volts in the example illustrated. In this way the plate cathode impedance of the pentode is made very low during the time that the pentode control grid is held positive by a horizontal synchronizing pulse, and complete discharge of the condenser C is insured.

The grid condenser 34 and grid leak resistor 35 may have the capacity and resistor values indicated on the drawings, it being possible to make the resistance of the grid leak resistor greater for the pentode than for the triode shown in Fig. 1. One advantage in using the pentode 36 rather than a triode is that its control grid need not be driven so far positive by the synchronizing pulses.

As shown in Fig. 2, the D. C. connection between the discharge tube 36 and the tube 21 may be of the conventional type including a biasing battery 38 in the D. C. connection for holding the grid of the tube 21 negative with respect to its cathode. The use of a cathode resistor as shown in Fig. 1 for obtaining the proper bias on the grid of tube 21 is preferred, however.

In Fig. 3 my invention is shown applied to a horizontal deflecting circuit in which the horizontal saw-tooth voltage waves are modulated by the vertical saw-tooth voltage waves for the purpose of providing keystone correction. It is well known that keystone correction is desired in transmitter circuits which employ cathode ray pickup tubes of the type in which the mosaic screen is positioned at an acute angle with respect to the axis of the tube. In Figs. 1 and 3 like parts are indicated by the same reference characters. As shown in Fig. 3, the desired modulation is obtained by feeding the vertical sawtooth voltage waves through an amplifier tube 41 so that they appear across the potentiometer 9 connected in shunt relation to the output circuit of this amplifier. As a result, there appears in the output circuit of an output tube 40 a series of horizontal saw-tooth voltage waves of gradually changing amplitude. Each saw-tooth wave, however, comes back to ground potential. These saw-tooth waves are fed through the primary winding of a transformer 43, the secondary winding of which is connected to a pair of electromagnetic deflecting coils 45.

Associated with the deflecting coils is the so-called "damping tube circuit" comprising a diode 44 having in series therewith a resistor 46 shunted by a condenser 47, this series combination being connected across the primary winding of transformer 43 in the particular example shown. A damping circuit of this character is described in Reissue No. 21,400, issued March 19, 1940, to A. D. Blumlein, and in Tolson application Serial No. 282,276, filed June 30, 1939.

It may be noted that while the saw-tooth voltage waves supplied to the grid of tube 40 are unsymmetrical with respect to an A. C. axis, this lack of symmetry is compensated for by the damping tube circuit with the result that a symmetrical saw-tooth current flows through the deflecting coils. In order to obtain the best results the resistor and capacitor elements 46 and 47 in series with the diode 44 should be given values such that a good vertical deflecting sawtooth voltage wave appears across them. This means that condenser 47 should have small capacity. For example, condenser 47 might be given a capacity of .05 mf. and the resistor 46 given a resistance of the order of about 5000 ohms.

In the drawings there have been indicated, by way of example, the values of certain condensers and resistors, these values being given in microfarads, micro-microfarads and in megohms. It should be understood that these values may be changed within rather wide limits. For example, the condenser C may have a value of 100 micro-microfarads instead of 200 micro-microfarads providing other circuit values are properly adjusted. It will also be understood that the value of the resistor R and the value of the charging voltage depend one upon the other just as in the conventional deflecting circuit, and that either or both may have values substantially different than those indicated.

I claim as my invention:

1. In a directly driven horizontal deflecting circuit, a saw-tooth wave generator comprising a condenser, means for charging said condenser for a certain period during which the voltage thereacross increases predominantly as a linear function with respect to time, an electric discharge tube connected to complete a discharge path through which said condenser may be discharged, said tube having a control grid and having a cathode at a certain potential for substantially completely discharging said condenser and thereby bringing it to said cathode potential at the end of said period in response to a positive synchronizing pulse of a certain minimum duration being applied to said control grid, an electric discharge tube having input electrodes which are direct current coupled across said condenser for supplying the saw-tooth voltage appearing thereacross to a utilization circuit, means for impressing upon said control grid a mixed signal comprising positive horizontal synchronizing pulses of comparatively short duration and positive vertical synchronizing pulses of comparatively long duration. the discharge path of said condenser having a time constant that is short enough so that said condenser will be substantially completely discharged by the shorter of said pulses as well as by the longer of said pulses.

2. A saw-tooth wave generating circuit comprising a condenser, means for charging said condenser for a certain period during which the voltage thereacross increases at least approximately linearly with respect to time, an electric discharge tube through which said condenser may be discharged, said tube having a control grid and having a cathode at a certain potential, means for discharging said condenser to said cathode potential at the end of said period, a vacuum tube having a control grid and a cathode which are direct current coupled across said condenser for supplying the saw-tooth voltage appearing thereacross to a utilization circuit, said direct current coupling including an output resistor connected between the cathode of said vacuum tube and ground and having the proper resistance to hold said last cathode positive with respect to the control grid of said vacuum tube.

3. In combination a horizontal deflecting circuit including a saw-tooth wave generator which comprises a condenser, means for charging said condenser for a certain period during which the voltage thereacross increases at least approximately linearly with respect to time, an electric discharge tube through which said condenser may be discharged said tube having a control grid and having a cathode at a certain potential, means for discharging said condenser to said cathode potential at the end of said period, an electric discharge tube having input electrodes which are direct current coupled across said condenser for supplying the horizontal saw-tooth voltage appearing thereacross to a utilization circuit, said utilization circuit comprising a pair of deflecting coils, a damping circuit connected effectively in shunt to said coils and comprising a series combination of diode and resistor, said resistor being shunted by a condenser to form a resistor-capacitor network, and means for modulating the said horizontal saw-tooth voltage waves by vertical deflecting saw-tooth waves recurring at a comparatively low frequency, said resistor-capacitor network having such values of capacity and resistance that a good vertical saw-tooth voltage wave appears thereacross to compensate for lack of symmetry in the modulated horizontal deflecting wave.

KARL R. WENDT.